United States Patent
Corbitt et al.

(10) Patent No.: US 11,172,674 B2
(45) Date of Patent: Nov. 16, 2021

(54) PRESERVATION SOLUTIONS (71) Applicant: ORGAN PRESERVATION SOLUTIONS LIMITED, Leeds (GB)

(72) Inventors: Terence Simon Corbitt, Leeds (GB); Malgosia Jarmolowicz, Leeds (GB); Clare Lankester, Leeds (GB); Jeremy Peter Alan Lodge, Leeds (GB); Oluseun Olarewaju, Leeds (GB); David John Potts, Leeds (GB)

(73) Assignee: ORGAN PRESERVATION SOLUTIONS LIMITED

( * ) Notice: Subject to any disclaimer, the term of this patent is extended or adjusted under 35 U.S.C. 154(b) by 26 days.

(21) Appl. No.: 16/630,948

(22) PCT Filed: Jul. 13, 2018

(86) PCT No.: PCT/GB2018/052008
§ 371 (c)(1),
(2) Date: Jan. 14, 2020

(87) PCT Pub. No.: WO2019/012299
PCT Pub. Date: Jan. 17, 2019

(65) Prior Publication Data
US 2020/0221689 A1 Jul. 16, 2020

(30) Foreign Application Priority Data

Jul. 14, 2017 (GB) .................................. 1711373
May 23, 2018 (GB) .................................. 1808479

(51) Int. Cl.
*A01N 1/02* (2006.01)

(52) U.S. Cl.
CPC ......... *A01N 1/0226* (2013.01); *A01N 1/0221* (2013.01)

(58) Field of Classification Search
None
See application file for complete search history.

(56) References Cited

U.S. PATENT DOCUMENTS 7,510,823 B2 * 3/2009 Potts .................... A01N 1/0226
435/1.1
9,049,857 B2 * 6/2015 Potts .................... A01N 1/0226

FOREIGN PATENT DOCUMENTS

WO         02/41696 A1     5/2002

OTHER PUBLICATIONS

Written Opinion of the International Searching Authority and International Search Report for International application No. PCT/GB2018/052008 dated Nov. 19, 2018 (5 pages).

* cited by examiner

*Primary Examiner* — Ralph J Gitomer
(74) *Attorney, Agent, or Firm* — K&L Gates LLP (57) ABSTRACT

There is described a preservation solution for the preservation of cells, tissues and/or organs, said solution comprising: (i) water for injection; (ii) at least one saccharide; (iii) at least one component with pH buffer properties; (iv) optionally at least one component with calcium transport blocking properties or an anti-calcium action activity; (v) salicylic acid, in free form or in salt form, or aspirin; and (vi) glutamic acid, in free form or in salt form, or glutamine; provided that acetamide is absent and/or if aspirin is present glutamine is absent and if glutamine is present aspirin is absent.

20 Claims, 3 Drawing Sheets

PRESERVATION SOLUTIONS

CROSS REFERENCE TO RELATED APPLICATIONS

This is the national phase under 35 U.S.C. § 371 of International Application No. PCT/GB2018/052008, filed on Jul. 13, 2018, which claims priority to and the benefit of United Kingdom Patent Application No. 1711373.9 filed on Jul. 14, 2017 and United Kingdom Patent Application No. 1808479.8 filed on May 23, 2018, the entire disclosures of each of which are incorporated by reference herein.

FIELD OF THE INVENTION

The present invention relates to a preservation solution or a cold storage preservation solution to keep cells without a blood supply viable, the use thereof to prevent damage to cells, tissues and/or organs in transplantation, surgery, experimentally and in vitro, a method for preservation, flush or flush preservation, a method for treatment, a method for preparation thereof, and a kit of parts comprising the solution.

More particularly the present invention relates to a preservation solution or a cold storage preservation solution as herein described which comprises salicylic acid and/or glutamic acid; and salts thereof.

BACKGROUND TO THE INVENTION

Organ transplantation is now available for kidney, liver, heart, lung, pancreas and intestine. At retrieval a transplant organ is flushed through its vasculature with a preservation solution. This solution is designed to facilitate the reduction of temperature of the organ, prevent cell swelling, remove oxygen free radicals, control pH, reduce ischaemic damage, extend the safe time for which organs can be kept out of the body and facilitate recovery of the organ upon reperfusion.

Important flush solutions were introduced by Belzer in 1967 and Collins in 1969, subsequently modified to Euro-Collins (EC), Marshall (1976), Bretschneider (see Isemer et al 1988), and others. University of Wisconsin solution (UW), the most successful of all solutions, was introduced in 1988 by Belzer and his colleagues. There remains a need for improved flush preservation and cold storage preservation. Overwhelming evidence indicates that a high quality graft provides both better immediate function and a longer functional graft lifetime.

A simple flush solution containing only sodium phosphate and sucrose was shown by Andrews and Coffey in 1982, and by Coffey and Andrews in 1983 to protect the morphology of kidney tubules from ischaemic damage.

International patent application No. WO 02/41696 (Potts, Lodge) describes a flush preservation solution for the preservation of cells in the absence of a blood supply, wherein said solution comprises:
  water for injection;
  at least one saccharide, such as a monosaccharide, disaccharide, trisaccharide, or polysaccharide;
  at least one component with pH buffer properties (i.e. a pH buffer);
  at least one component with calcium transport blocking properties or an anti-calcium action activity (i.e. a calcium transport blocker);
  optionally an amino acid, such as glutamine; and
  optionally a thromboxane inhibitor to prevent blood clotting, such as aspirin.

Accordingly, there remains a need for an improved commercially viable and effective preservation solution which enables extended preservation of cells, tissues and organs, including engineered cells, tissues and organs, which provides improved versatility, effectiveness and reperfusion in transplantation, in surgery, including any situation of warm or cold ischaemia, such as transplantation of liver, kidney, small bowel and/or pancreas; whole limb, whole body, or in experimentation.

SUMMARY OF THE INVENTION

We have found that the aspirin (aspirin is the common name for acetylsalicylic acid) in the prior art solution of WO 02/41696 degrades to produce salicylic acid, whilst the glutamine degrades to glutamic acid.

Degradation of aspirin will produce salicylic acid and acetic acid, whilst degradation of glutamine will produce glutamic acid and ammonia. Moreover, we have found that both acetic acid and ammonia are undesirable in a preservation solution as they are both potentially damaging to cells, tissues and organs; and are likely to generate noxious odours, which may increase on storage of the preservation solution. Furthermore, we have found that over time acetic acid and ammonia may react together in the prior art solution of WO 02/41696, to form acetamide. Acetamide is recognised as a skin irritant and is recognised as a hazardous substance which may damage the liver.

Thus, by replacing aspirin with salicylic acid and/or replacing glutamine with glutamic acid, or salts thereof, the amount of acetic acid and/or ammonia respectively generated, may be minimised or removed completely. In examples, it is demonstrated that the use of the solution of the invention for preservation reduces damage to cells and tissues during preservation when compared to comparative solutions.

In the prior art solution, aspirin is added as an anti-inflammatory thromboxane inhibitor. We have found that if the aspirin is omitted and salicylic acid added, salicylic acid has anti-inflammatory properties (i.e. is an anti-inflammatory). Also, in the prior art solution, glutamine is added as a supporting molecule which can provide energy. We have found that if glutamine is omitted it can be replaced by glutamic acid which will act as an alternative energy substrate for the cells, tissues and/or organs.

In addition, we have found that since the novel solution of the present invention no longer represents any concern about the degradation of aspirin and/or glutamine, the amounts of the replacement components, e.g. salicylic acid and/or glutamic acid can consequently be reduced.

Therefore, according to a first aspect of the invention there is provided a preservation solution for the preservation of cells, tissues and/or organs, in the absence of a blood supply, said solution comprising:
  (i) water for injection;
  (ii) at least one saccharide, such as a monosaccharide, disaccharide, trisaccharide, or polysaccharide;
  (iii) at least one component with pH buffer properties;
  (iv) optionally at least one component with calcium transport blocking properties or an anti-calcium action activity;
  (v) salicylic acid, in free form or in salt form, or aspirin; and
  (vi) glutamic acid, in free form or in salt form, or glutamine;

provided that acetamide is absent and/or if aspirin is present glutamine is absent and if glutamine is present aspirin is absent.

The term "absent" or "substantially absent" shall be understood by the person skilled in the art to mean below a pharmacologically active concentration; or none detectable by conventional methods known in the art. Such methods shall include, but shall not be limited to colorimetric assay and GCMS.

As a further proviso, if only one of aspirin and glutamine is present, then the degradation product of the other is not present, that is to say, if aspirin is present then ammonia is not present; and if glutamine is present then acetic acid is not present.

Salicylic acid, in free form or in salt form, or aspirin, (v) suitably serves to prevent blood clotting. Suitably the preservation solution comprises an amount of salicylic acid, in free form or in salt form, or aspirin (v) to prevent blood clotting.

Glutamic acid, in free form or in salt form, or glutamine, (vi) suitably serves as an energy substrate. Suitably the preservation solution comprises an amount of glutamic acid, in free form or in salt form, or glutamine (vi) to serve as an energy substrate.

In one particular aspect of the present invention the preservation solution as herein described comprises:
(v) salicylic acid, in free form or in salt form, or aspirin; and
(vi) glutamic acid, in free form or in salt form, or glutamine;
provided that acetamide is absent and/or at least one of acetic acid and ammonia is absent.

According to a further aspect of the present invention there is provided a preservation solution for the preservation of cells, tissues and/or organs, said solution comprising:
(i) water for injection;
(ii) at least one saccharide, such as a monosaccharide, disaccharide, trisaccharide, or polysaccharide;
(iii) at least one component with pH buffer properties;
(iv) optionally at least one component with calcium transport blocking properties or an anti-calcium action activity;
(v) salicylic acid, in free form or in salt form, or aspirin; and
(vi) glutamic acid, in free form or in salt form, or glutamine;
wherein if (v) is aspirin (vi) is glutamic acid, in free form or salt form, and if (vi) is glutamine (v) is salicylic acid, in free form or salt form.

Preferably the preservation solution comprises an admixture of (i) to (vi) as herein described, thereby providing said preservation solution from which acetamide is absent. For example, one of aspirin and glutamine is present and acetamide is absent and/or one of acetic acid and ammonia is present and acetamide is absent, or both of aspirin and glutamine, and both of acetic acid and ammonia are absent, and acetamide is absent.

In one aspect of the invention there is provided a preservation solution as herein described for the preservation of cells, tissues and/or organs, in the absence of a blood supply.

In embodiments herein there is provided a prepared preservation solution comprising a preservation solution as herein described, wherein acetamide is absent, for example one of aspirin and glutamine is present and acetamide is absent and/or one of acetic acid and ammonia is present and acetamide is absent, or both of aspirin and glutamine, and both of acetic acid and ammonia are absent, and acetamide is absent.

The prepared preservation solution may be packaged for storage, e.g. under anoxic conditions, in the absence of UV light. The prepared preservation solution herein described is sterile and packaged for storage under anoxic conditions in the absence of UV light.

According to one aspect of the invention the preservation solution is a flush preservation solution.

According to another aspect of the invention the preservation solution is a cold storage preservation solution.

In one embodiment, (v) is salicylic acid, in free form or in salt form; and
(vi) is glutamic acid, in free form or in salt form, or glutamine; provided that aspirin is absent, preferably aspirin and acetamide are absent and/or acetic acid and acetamide are absent.

In another embodiment, (v) is salicylic acid, in free form or in salt form, or aspirin; and
(vi) is glutamic acid, in free form or in salt form;
provided that glutamine is absent, preferably glutamine and acetamide are absent and/or ammonia and acetamide are absent.

In another embodiment, (v) is salicylic acid, in free form or in salt form; and
(vi) is glutamic acid, in free form or in salt form;
provided that glutamine and aspirin are absent, preferably acetamide is additionally absent and/or acetic acid, ammonia and acetamide are absent.

In a preferred preservation solution of the invention, aspirin is replaced by salicylic acid, in free form or in salt form, and glutamine is replaced by glutamic acid, in free form or in salt form, such that both aspirin and glutamine are substantially absent from the solution, preferably acetamide is additionally absent and/or acetic acid, ammonia and acetamide are absent.

In another embodiment of the invention there is provided a preservation solution as herein described comprising:
(v) salicylic acid, in free form or in salt form, and/or aspirin; and
(vi) glutamic acid, in free form or in salt form, and/or glutamine;
provided that if aspirin is present glutamine is absent and if glutamine is present aspirin is absent and/or wherein if aspirin and/or acetamide and/or acetic acid is present, the amount of salicylic acid present exceeds that which can be attributed to degradation from aspirin, for example as determined by the sum of the amounts of any acetic acid and of any acetamide present; and/or
wherein if glutamine and/or acetamide and/or ammonia is present, the amount of glutamic acid present exceeds that which can be attributed to degradation from glutamine, for example as determined by the sum of the amounts of any ammonia and of any acetamide present.

In particular, there is provided a preservation solution as herein described comprising:
(v) salicylic acid, in free form or salt form, and/or aspirin; and
(vi) glutamic acid, in free form or salt form, and/or glutamine; provided that (v) is salicylic acid, in free form or salt form, and aspirin and/or
(vi) is glutamic acid, in free form or salt form, and glutamine;
provided that if aspirin is present glutamine is absent and if glutamine is present aspirin is absent; and/or wherein if aspirin and/or acetamide and/or acetic acid is present, the amount of salicylic acid present exceeds that which can be attributed to degradation from aspirin, for example as determined by the sum of the amounts of any acetic acid and of any acetamide present; and/or wherein if glutamine and/or acetamide and/or ammonia is present, the amount of glutamic acid present exceeds that which can be attributed to degradation from glutamine, for example as determined by the sum of the amounts of any ammonia and of any acetamide present.

There is also provided a preservation solution as herein described comprising:
(v) salicylic acid, in free form or in salt form, and optionally additionally aspirin; and
(vi) glutamic acid, in free form or in salt form, and/or glutamine;

provided that acetamide is absent and/or if aspirin is present glutamine is absent and if glutamine is present aspirin is absent; or wherein if aspirin and/or acetamide and/or acetic acid is present, the amount of salicylic acid present exceeds that which can be attributed to degradation from aspirin, for example as determined by the sum of the amounts of any acetic acid and of any acetamide present; and/or wherein if glutamine and/or acetamide and/or ammonia is present, the amount of glutamic acid present exceeds that which can be attributed to degradation from glutamine, for example as determined by the sum of the amounts of any ammonia and of any acetamide present.

There is further provided a preservation solution as herein described comprising:
(v) salicylic acid, in free form or in salt form, and optionally additionally aspirin; and
(vi) glutamic acid, in free form or in salt form, and/or glutamine;

provided that: when (v) is salicylic acid, in free form or in salt form and aspirin is absent, (vi) is glutamic acid, in free form or in salt form, and glutamine.

According to the invention there is provided a preservation solution as herein described comprising:
(v) salicylic acid, in free form or in salt form, and optionally additionally aspirin; and
(vi) glutamic acid, in free form or in salt form, and glutamine.

According to the invention there is provided a preservation solution as herein described comprising:
(v) salicylic acid, in free form or in salt form, and aspirin; and
(vi) glutamic acid, in free form or in salt form, and/or glutamine.

According to the invention there is provided a preservation solution as herein described comprising:
(v) salicylic acid, in free form or in salt form, and aspirin; and
(vi) glutamic acid, in free form or in salt form, and glutamine.

According to the invention there is provided a preservation solution as herein described comprising:
(v) salicylic acid, in free form or in salt form, and aspirin; and
(vi) glutamic acid, in free form or in salt form, or glutamine.

According to the invention there is provided a preservation solution as herein described comprising:
(v) salicylic acid, in free form or in salt form; and
(vi) glutamic acid, in free form or in salt form and glutamine.

According to the invention there is provided a preservation solution as herein described comprising:
(v) salicylic acid, in free form or in salt form, and/or aspirin; and
(vi) glutamic acid, in free form or in salt form, and optionally additionally glutamine;

provided that acetamide is absent and/or if aspirin is present glutamine is absent and if glutamine is present aspirin is absent;

or wherein if glutamine and/or acetamide and/or ammonia is present, the amount of glutamic acid present exceeds that which can be attributed to degradation from glutamine, for example as determined by the sum of the amounts of any ammonia and of any acetamide present and/or wherein if aspirin and/or acetamide and/or acetic acid is present, the amount of salicylic acid present exceeds that which can be attributed to degradation from aspirin, for example as determined by the sum of the amounts of any acetic acid and of any acetamide present.

According to this aspect of the invention there is provided a preservation solution as herein described comprising:
(v) salicylic acid, in free form or in salt form, and/or aspirin; and
(vi) glutamic acid, in free form or in salt form, and optionally additionally glutamine;

provided that: when (vi) is glutamic acid, in free form or in salt form and glutamine is absent, (v) is salicylic acid, in free form or in salt form, and aspirin.

According to the invention there is provided a preservation solution as herein described comprising:
(v) salicylic acid, in free form or in salt form, and aspirin; and
(vi) glutamic acid, in free form or in salt form, and optionally additionally glutamine.

According to the invention there is provided a preservation solution as herein described comprising:
(v) salicylic acid, in free form or in salt form, and/or aspirin; and
(vi) glutamic acid, in free form or in salt form, and glutamine.

According to the invention there is provided a preservation solution as herein described comprising:
(v) salicylic acid, in free form or in salt form, and aspirin; and
(vi) glutamic acid, in free form or in salt form, and glutamine.

According to the invention there is provided a preservation solution as herein described comprising:
(v) salicylic acid, in free form or in salt form, or aspirin; and
(vi) glutamic acid, in free form or in salt form, and glutamine.

According to the invention there is provided a preservation solution as herein described comprising:
(v) salicylic acid, in free form or in salt form, and aspirin; and
(vi) glutamic acid, in free form or in salt form.

For the avoidance of doubt it will be understood by the person skilled in the art that reference herein to cells, tissues and organs, shall include engineered cells, tissues and organs.

In one aspect of the invention at least one component with calcium transport blocking properties or an anti-calcium action activity is present in the preservation solution of the invention.

In another aspect of the invention the component with calcium transport blocking properties or an anti-calcium action activity is absent from the preservation solution of the invention.

In one aspect in the preservation solution of the invention the amount of salicylic acid, in free form or in salt form, sufficient to prevent blood clotting, is less than 0.5 mmol/L, for example from about 0.025 to less than 0.3 mmol/L. Alternatively, the amount of salicylic acid sufficient to prevent blood clotting, is from about 0.025 to about 0.275 mmol/L, preferably about 0.25 mmol/L salicylic acid, in free form or in salt form.

Alternatively, aspirin, if present, is suitably present in an amount of from about 0.3 mmol/L to about 1.0 mmol/L, for example 0.5 mmol/L.

In another aspect in the preservation solution of the invention the amount of glutamic acid, in free form or in salt form, present is less than 20 mmol/L. Alternatively, the amount of glutamic acid present is from about 2 to less than 15, or from about 15 to less than 20, such as from about 2 to about 12 mmol/L, preferably about 3 mmol/L glutamic acid, in free form or in salt form.

Alternatively glutamine, if present, is suitably present in an amount of from about 15 mmol/L to about 30 mmol/L for example approximately 20 mmol/L. Alternatively, the amount of glutamine present is from about 2 to less than 15 mmol/L.

The salts of salicylic acid and/or glutamic acid, which may be the same or different, will be pharmacologically acceptable salts, that is, salts that possesses the desired pharmacological activity of the parent compound. In particular, such salts shall be non-toxic to cells, tissues and/or organs. Such salts will generally be formed when an acidic proton present in the salicylic acid and/or glutamic acid either is replaced by a metal ion, e.g., an alkali metal ion or an alkaline earth ion. By way of example only, alkali metal salts include sodium or potassium, and the like. By way of example only, alkaline earth metal salts include calcium or magnesium, and the like.

The flush solution may consist only of these components, in which case it is suited for preservation of universal cell types and functioning, in particular for preservation of simple cell systems, alternatively it may be provided together with one or more further substituents specifically suited to the preservation of a desired type or function of cell, in particular in the preservation of complex cell systems such as organs or living tissue, more particularly for small or large animals, most particularly human organs, such as liver, kidney, small bowel and/or pancreas; and living tissue.

According to this aspect of the invention there is provided a preservation solution for liver, kidney, small bowel and pancreas preservation comprising a combination of
(i) water for injection;
(ii) a disaccharide;
(iii) at least one component with pH buffer properties;
(iv) at least one calcium transport or channel blocker;
(v) salicylic acid, in free form or in salt form, or aspirin; and
(vi) glutamic acid, in free form or in salt form, or glutamine, as hereinbefore defined; together with an impermeant sequestering anion, inorganic solutes, components effective against oxygen free radicals and a colloidal osmotic, and any optional additional components as hereinbefore defined.

There is further provided a preservation solution for liver, kidney, small bowel and pancreas preservation comprising a combination of
(i) water for injection;
(ii) sucrose;
(iii) $Na_2HPO_4$ and $NaH_2PO_4$;
(iv) diltiazem;
(v) salicylic acid, in free form or in salt form, or aspirin; and
(vi) glutamic acid, in free form or in salt form, or glutamine, as hereinbefore defined; together with lactobionic acid, KOH and NaOH, glutathione and allopurinol and PEG, and any optional additional components as hereinbefore defined.

The preservation solution of the present invention has a number of advantages in terms of improving existing solutions, with reduced damage during preservation, due the absence of toxic ammonia and acetic acid, and the possibility to extend preservation periods, in addition to the provision of a kit from which to create a particular desired solution, with the associated convenience and cost implications which will render such solution commercially viable.

The present invention has found that the preservation solution defined herein is universally acceptable, based on experiments and without attempting to rationalise the underlying preservation mechanism.

All components of the preservation solution of the present invention satisfy National or International Pharmacopoeial Standards of purity where applicable. Water for injection is typically purified and de-ionized prior to sterilization.

A saccharide is selected from sucrose, raffinose and mannitol; and combinations thereof. A preferred saccharide is sucrose. A saccharide may be present in an amount of from about 50 mmol/L to about 150 mmol/L, for example, about 100 mmol/L.

A pH buffer is selected from a sodium phosphate buffer, a potassium phosphate buffer and the like, preferably $Na_2HPO_4$, $NaH_2PO_4$, $K_2HPO_4$, $KH_2PO_4$ and the like; and combinations thereof. A pH buffer may be present in an amount of from about 15 mmol/L to about 75 mmol/L, for example, from about 15 mmol/L to about 20 mmol/L or from about 40 to about 70 mmol/L.

The preservation solution of the invention is preferably formulated to comply with a desired range of the pharmacopoeially acceptable physical properties. Preferably the solution has a pH in the range 6.5-7.8, more preferably 6.5-7.0, most preferably 6.8-7.0. The pH is generally measured at room temperature, e.g. about 20° C.

An optionally added calcium transport blocker or anti-calcium activity agent is selected from any known calcium transport or channel blocker, such as nicardipine, diltiazem, verapamil, nisoldipine, chlorpromazine or trifluorperazine; and combinations thereof and metabolites thereof. Preferably a calcium transport or channel blocker is nicardipine and/or diltiazem; or metabolites thereof. A calcium transport or channel blocker may be present in an amount of from about 0.0005 mmol/L to about 1.0 mmol/L, for example, about 0.005 mmol/L. When the calcium transport or channel blocker is nicardipine, nicardipine may be present in an amount of from about 0.0005 mmol/L to about 1.0 mmol/L, for example, about 0.005 mmol/L. When the calcium transport or channel blocker is diltiazem, diltiazem may be present in an amount of from 0.0005 mmol/L to about 1.0 mmol/L, for example, about 0.022 mmol/L.

Without being limited to this theory, reference is made herein to components by function, based on commonly accepted pharmacological and physiological activity, however for the avoidance of doubt, components listed may contribute additional or different function to that attributed, and this should not be seen as a limitation thereof. Additionally, functional equivalents to those listed may be considered within the scope of this invention.

Other components may be present in the preservation solution. Other components, unless otherwise indicated, will typically be present in minor amounts for example in the range up to 1 mmol/L.

Preferably, the preservation solution of the invention comprises one or more additional components selected from:
- at least one anion that is largely impermeable into cells, preferably is an impermeant sequestering anion; and
- at least one component with colloid osmotic properties (i.e. a colloidal osmotic).

An impermeant sequestering anion preferably comprises lactobionate or lactobionic acid. When an impermeant sequestering anion is present, it may be in an amount of from about 15 mmol/L to about 75 mmol/L, for example, from about 15 mmol/L to about 20 mmol/L or from about 40 mmol/L to about 70 mmol/L.

A colloidal osmotic is preferably selected from polyethylene glycol (PEG), succinylated gelatin (as in Gelofusine), Ficoll (a polysaccharide) and a starch product; and combinations thereof. When a component with colloid osmotic properties is present, it may be in an amount of from about 0.5 mmol/L to about 3.0 mmol/L, for example from about 0.75 mmol/L to about 1.33 mmol/L, such as, about 1.0 mmol/L, and 20,000 MW.

Alternatively or additionally, the preservation solution of the invention may comprise one or more components selected from:
- inorganic or organic solutes;
- a component or components with calcium chelating properties (i.e. a calcium chelator); and
- a component or components with iron chelating properties (i.e. an iron chelator).

Preferably an inorganic or organic solute comprises an inorganic solute and is an electrolyte including cations and/or anions, for example selected from $Na^+$, $K^+$, $OH^-$, and the like; and combinations thereof. In a preferred aspect of the invention the solute is an inorganic solute, such as NaCl. When an inorganic or organic solute is present, it may be in an amount of from about 15 mmol/L to about 75 mmol/L, for example, from about 15 mmol/L to about 20 mmol/L or from about 40 mmol/L to about 70 mmol/L.

Preferably a calcium chelator comprises citrate or EGTA (ethylene glycol-bis(β-aminoethyl ether)-N,N,N',N'-tetra acetic acid) and an iron chelator comprises EDTA (ethylene diamine tetra acetic acid).

Alternatively, or additionally, the preservation solution of the invention may comprise one or more components selected from:
- one or more (additional) amino acids, in addition to glutamic acid and/or glutamine;
- at least one component that is effective against oxygen free radicals or the production of oxygen free radicals;
- at least one component of the energy supply system or which influences the energy supply system or a ketone body; and
- at least one component that has a cryoprotectant action.

Preferably, an additional amino acid is selected from glycine and n-acetylcysteine, and a combination thereof.

When an additional amino acid component is present, it may be in an amount of from about 1 mmol/L to about 30 mmol/L, preferably from about 3 mmol/L to about 12 mmol/L, for example about 10 mmol/L.

Preferably oxygen free radical inhibitors are selected from allopurinol and reduced glutathione, more preferably a combination thereof. When a component effective against oxygen free radicals is present, it may be in an amount of from about 0.2 mmol/L to about 5 mmol/L, for example, from about 3 mmol/L to about 5 mmol/L. Generally, the amount of oxygen free radical inhibitors defined herein refers to the total amount of oxygen free radical inhibitors. For example, when the oxygen free radical inhibitors comprises a combination of allopurinol and reduced glutathione, the amount of the combined oxygen free radical inhibitors may be in an amount of from about 0.2 mmol/L to about 5 mmol/L, etc.

Preferably an energy supply system component comprises adenosine. When an energy supply component is present, it may be in an amount of up to about 20 mmol/L, for example, from about 5 to about 20 mmol/L, such as about 5 mmol/L.

Preferably a ketone body comprises beta-hydroxy butyrate.

Cryoprotectants are compounds that when present in solution can reduce or inhibit ice crystal formation in solutions exposed to sub 0° C. temperatures. Thus, the use of a cryoprotectant enables the cells, tissue or organ to be stored at a temperature of from about −20° C. to about 4° C. Preferably a cryoprotectant is selected from a glycol such as propylene glycol, DMSO, a saccharide, a carbohydrate, a lipid, a glycolipid such as xylomannan, a glycoprotein, protein or polypeptide or a polyol; or a combination thereof. When a cryoprotectant is present, it may be in an amount of from about 5 to about 100 mg/mL.

Alternatively, or additionally, the preservation solution of the invention may comprise additional components for a specific function selected from:
- at least one component of the intracellular signal transduction system or which modifies this system, preferably a protein kinase inhibitor or a calmodulin inhibitor; and
- at least one component that has a membrane stabilising action, preferably ranolazine, and the like.

Preferably, a saccharide component (ii) is present in an amount in the range 50-150 mmol/L, for example, approximately 100 mmol/L;
the pH buffer component (iii) is present in a total amount in the range 15-75 mmol/L, for example approximately 15-20 or 40-70 mmol/L;
the an impermeant sequestering anion is present in a total amount in the range 15-75 mmol/L, for example approximately 15-20 or 40-70 mmol/L;
the inorganic or organic solute component is present in a total amount in the range 15-75 mmol/L, for example approximately 15-20 or 40-70 mmol/L;
the additional amino acid component is present in an amount in the range 5-30 mmol/L, preferably 5-12 mmol/L, for example approximately 10 mmol/L;
the component effective against oxygen free radicals is present in a total amount in the range up to 5 mmol/L, for example approximately 3-5 mmol/L;
the energy supply component is present in an amount in the range of up to 20 mmol/L, for example 5 mmol/L;
the component with colloid osmotic properties is present in an amount in the range 0.5-3.0 mmol/L, for example approximately 0.75-1.33 mmol/L, such as 1.0 mmol/L, and 20,000 MW;

when the component with calcium transport blocking properties (iv) is present, the calcium transport blocking agent may be, for example, nicardipine or diltiazem. Nicardipine may be present in an amount in the range 0.0005-1.0 mmol/L, for example, 0.005 mmol/L; and diltiazem may be present in an amount in the range 0.0005-1.0 mmol/L, for example, 0.022 mmol/L.

In the case of certain components present as 2 or more types, the relative amounts may be critical or non-critical. A preferred component effective against oxygen free radicals is approximately 3 mmol/L reduced glutathione and 0.35 to 0.4, more preferably 0.4 mmol/L allopurinol.

A preferred inorganic or organic solute component comprises electrolytes as follows:

$Na^+$ 15-150 mmol/L, e.g. 30 mmol/L
$K^+$ 0-25 mmol/L, e.g. 15 mmol/L
$Cl^-$ 0-100 mmol/L
$OH^-$ 0-75 mmol/L Preferably a solution according to the invention is prepared and stored under anoxic condition in the absence of UV light.

It is a particular advantage that the solution as defined comprising components (i)-(vi) may be stored for extended periods, and additional components required for clinical use (e.g. heparin) added immediately prior to use thereof. It is especially an advantage of the solution of the present invention that the solution may be stored for extended periods without the generation of undesirable degradation products. More particularly, the solution may be stored without the generation of one or both of acetic acid and ammonia, and without the generation of acetamide.

Alternatively, the solution may be stored with the generation of one or both of acetic acid and ammonia, and/or with the generation of acetamide, in amount less than the molar equivalent of salicylic acid and glutamic acid respectively.

The preservation solution of the invention as herein defined preferably comprises the basic components (i)-(vi) together with additional components for specific function. The solution for use in preserving organs is particularly of greater complexity than that for preserving simple cell systems, however we have found that the solution may nevertheless be relatively straightforward.

Preferably a preservation solution for intra-abdominal organs such as kidney, liver and pancreas; and also intestine and bowel and the like; comprises components (i)-(vi) as herein defined together with at least one component selected from an impermeant sequestering anion component; and a component with colloid osmotic properties; and more preferably, additionally one or more components selected from:
  inorganic or organic solute component;
  an additional amino acid component;
  a component effective against oxygen free radicals; and
  an energy supply component.

Preferably a preservation solution for liver, kidney, small bowel and pancreas preservation comprises a combination:
  (i) water for injection;
  (ii) a disaccharide;
  (iii) at least one component with pH buffer properties;
  (iv) at least one calcium transport or channel blocker;
  (v) salicylic acid, in free form or in salt form, or aspirin; and
  (vi) glutamic acid, in free form or in salt form, or glutamine, as hereinbefore defined; together with an impermeant sequestering anion, inorganic solutes, components effective against oxygen free radicals and a colloidal osmotic, and any optional additional components as herein defined;

more preferably a combination of
  (ii) water for injection;
  (ii) sucrose;
  (iii) $Na_2HPO_4$ and $NaH_2PO_4$;
  (iv) diltiazem or nicardipine;
  (v) salicylic acid, in free form or in salt form, or aspirin; and
  (vi) glutamic acid, in free form or in salt form, or glutamine, as hereinbefore defined; together with lactobionic acid, KOH and NaOH, glutathione and allopurinol and PEG, and any optional additional components as herein defined; more preferably comprises a combination of component classes given below, more preferably of the specific type listed, and substantially in the amount listed as follows, together with any optional additional components as herein defined, when made up to volume in water:

| Component | Type | Amount (mmol/L) |
|---|---|---|
| impermeant sequestering anion component | Lactobionic acid or lactobionate | 40-70 |
| inorganic solute components | KOH & NaOH | 40-70 |
| components effective against oxygen free radicals | Glutathione and Allopurinol | 3-5 |
| pH buffer component (iii) | $Na_2HPO_4$ & $NaH_2PO_4$ | 40-70 |
| amino acid (vi) | Glutamic acid; or Glutamine | 2-20 or <20 such as 2-19.9; or 15-30 |
| saccharide component (ii) | Sucrose | 50-150 |
| anti-inflammatory (v) | Salicylic acid; or Aspirin | 0.025-0.5 or <0.5 such as 0.025 0.49; or 0.3-1.0 |
| component with calcium transport blocking (iv) | Diltiazem | 0.0005-1.0 |
| colloid component | PEG (20,000 MW) | 0.5-3.0 | provided that if (v) is aspirin, (vi) is not glutamine;

and most preferably substantially in the amount listed as follows, together with any optional additional components as hereinbefore defined, when made up to volume in water:

| Component | Type | Amount (mmol/L) |
|---|---|---|
| impermeant sequestering anion component | Lactobionic acid | 50 |
| inorganic solute component | KOH | 15 |
| inorganic solute component | NaOH | 35 |
| component effective against oxygen free radicals | Glutathione | 3 |
| pH buffer component (iii) | $Na_2HPO_4$ | 26.45 |
| pH buffer component (iii) | $NaH_2PO_4$ | 16.66 |
| glutamic acid or glutamine (vi) | Glutamic acid or glutamine | <20 or 19.9; or 20 |
| saccharide component (ii) | Sucrose | 100 |
| salicylic acid or aspirin (v) | Salicylic acid or aspirin | <0.5 or 0.49, or 0.5 |
| component effective against oxygen free radicals | Allopurinol | 0.4 |

-continued

| Component | Type | Amount (mmol/L) |
|---|---|---|
| component with calcium transport blocking (iv) | Diltiazem | 0.0022 |
| colloid component | PEG (20,000 MW) | 1 | provided that if (v) is aspirin, (vi) is not glutamine.

We have moreover surprisingly found that the effectiveness of constituents of a preservation solution according to the invention is improved by the replacement of certain constituents with their principal degradation products. Without being limited to this theory, it seems that the by-products of such degradation can exert unwanted toxic effects during the use of the preservation solution both individually and in combination. For example acetic acid and ammonia form acetamide which is potentially damaging to the liver. By removing this toxic effect, the effectiveness of the preservation solution is improved.

Accordingly, the finding according to the present invention is that certain substituents are essential for the preservation of the principle cell functions essential to all cell types and these have been identified as the component (i) to (vi) as herein defined. Whilst this solution may be highly effective or satisfactory in preserving simple tissue or cellular systems, if it is desired to preserve organs or cell systems requiring or providing unusual or more complex cell function, it is necessary to incorporate substituents specifically directed to preserve the requisite or provided function, whether this be muscular, electrical, specific membrane activity, energy supply and the like.

Thus, the invention particularly provides a preservation solution as herein defined for liver, kidney, small bowel and pancreas preservation.

The solution is suitably made up by methods as known in the art by simple admixture under pharmacopoeially acceptable conditions. Preferably components are determined and incorporated in a desired molar concentration.

It will be appreciated that variation may be specific or non-specific to the effectiveness of the solution and that an amount of variation which has no effect on the performance of the fluid is considered within the scope of this invention. Selection of component type, requiring an amount of verification by routine experimentation, is considered within the scope of this invention.

In a further aspect of the invention there is provided a method for the preparation of a preservation solution comprising adding components (i)-(vi) in sequence to water, together with any additional components, with the exception of the component with colloid osmotic properties and unstable components if any, e.g. aspirin or glutamine, and dissolving the mixture; adding the component with colloid osmotic properties, if any, and making the solution nearly up to volume; and finally making up to volume to regulate pH, sterilising and cooling to 0-4° C. The solution may be stored if desired with subsequent addition of any unstable components (e.g. aspirin and/or glutamine) immediately prior to use. The method according to this aspect of the invention may include packaging the prepared solution for storage, preferably at reduced temperature, more preferably in the range 0-12° C., most preferably 0-4° C. e.g. packaging the prepared solution in an anoxic condition and in the absence of UV light.

In a further aspect there is provided a preservation solution obtained by the method as herein described.

In embodiments herein there is provided a preservation solution obtained by a method comprising adding components (i)-(vi) to water.

In a further aspect of the invention there is provided the use of a preservation solution as herein defined as a flush preservation solution or a cold storage preservation solution; for the preservation of cells in the absence of a blood supply, in particular to prevent damage to organs, living tissues and cells. The solution is suited for use with small or large animal or mammalian, in particular human cells, tissues and organs.

The use of the solution may be in transplantation including organs from heart beating or non-heart beating donors, in surgery including any situation of warm or cold ischaemia, whole limb or whole body preservation, in experimentation on living tissues, in culturing and preserving engineered cells, tissues and organs and the like. Preferably the solution is used as a flush solution brought into contact with cells, tissues or organs, limbs or the whole body via the vascular system, and optionally additionally serves as a preservation solution for storage of flushed cells, tissues and organs. The solution is suitable for extended preservation of the cells, tissues, organs in both hypothermic static storage and with a hypothermic machine perfusion system.

Thus, the invention particularly provides a preservation solution as herein defined for liver, kidney, small bowel and pancreas preservation.

In a further aspect of the invention there is provided a method for flushing, preserving or flush preservation of cells, in particular living cells, tissues or organs whereby the cells, tissue or organs are brought into contact with a solution as herein defined.

According to this aspect of the invention there is provided a method for flushing, preserving or flush preservation of cells for simple hypothermic storage, in particular living cells, tissues or organs whereby the cells, tissue or organs are brought into contact with a preservation solution comprising:
  (i) water for injection;
  (ii) at least one saccharide, such as a monosaccharide, disaccharide, trisaccharide, or polysaccharide;
  (iii) at least one component with pH buffer properties;
  (iv) optionally at least one component with calcium transport blocking properties or an anti-calcium action activity;
  (v) salicylic acid, in free form or in salt form, or aspirin; and
  (vi) glutamic acid, in free form or in salt form, or glutamine;
  provided that acetamide is absent and/or if aspirin is present glutamine is absent and if glutamine is present aspirin is absent; more particularly wherein if (v) is aspirin (vi) is glutamic acid, in free form or salt form, and if (vi) is glutamine (v) is salicylic acid, in free form or salt form;
  whereby the cells, tissue or organ are flushed with solution, removed from the normal locus, cooled to temperatures normally in the range between zero and 12° C. and stored.

According to this aspect of the invention if acetamide is absent, then at least one of acetic acid and ammonia is absent.

According to one aspect of the invention the method comprises the flush preservation of living cells, tissues or organs.

According to another aspect of the invention the method comprises cold storage preservation of living cells, tissues or organs.

In a preferred method according to this aspect of the invention, aspirin is replaced by salicylic acid, in free form or in salt form, and glutamine is replaced by glutamic acid, in free form or in salt form, such that both aspirin and glutamine are substantially absent from the solution, preferably acetamide is additionally absent and/or acetic acid, ammonia and acetamide are additionally absent, more particularly wherein (v) is salicylic acid, in free form or salt form, and (vi) is glutamic acid, in free form or salt form.

According to a further aspect of the invention there is provided a method for the preservation of cells for simple hypothermic storage, in particular living cells, tissues or organs whereby the cells, tissue or organs are brought into contact with a preservation solution comprising:
(i) water for injection;
(ii) at least one saccharide, such as a monosaccharide, disaccharide, trisaccharide, or polysaccharide;
(iii) at least one component with pH buffer properties;
(iv) optionally at least one component with calcium transport blocking properties or an anti-calcium action activity;
(v) salicylic acid, in free form or in salt form, or aspirin; and
(vi) glutamic acid, in free form or in salt form, or glutamine; and
at least one component with cryoprotectant properties (i.e. a cryoprotectant);
provided that acetamide is absent and/or at least one of acetic acid and ammonia is additionally absent; more particularly wherein if (v) is aspirin (vi) is glutamic acid, in free form or salt form, and if (vi) is glutamine (v) is salicylic acid, in free form or salt form;
whereby the cells, tissue or organ are flushed with solution, removed from the normal locus, cooled to temperatures normally in the range between −20° C. and 12° C. and stored.

According to this aspect of the invention if acetamide is absent, then at least one of acetic acid and ammonia is absent.

The method may be for simple hypothermic storage, whereby the cells, tissue or organ are flushed with solution, removed from the normal locus, cooled, preferably to temperatures normally in the range between zero and 12° C. and stored. In addition, if a cryoprotectant is present the tissue or organ may be stored at a temperature of from about −20° C. to about 4° C. In addition, the solution may be actively flushed through the organ. We have found that cells, tissues or organs can be stored for extended periods exceeding those currently practised, for example, kidney and liver for periods of the order of 48 hours or more. Additionally, or alternatively, the method is for the preservation of cells, particularly tissue or organs, whereby the cells, tissue or organs have been flushed and brought into a hypothermic state and are contacted with the preservation solution by immersion or perfusion.

Preferably, the method of the invention comprises administering to the cells, tissue, organ or to a donor a biologically effective amount of the solution of the invention, at an effective rate or in an effective concentration to maintain or enhance function thereof. Preferably, the method is a method for preserving certain cell, tissue or organ function, for example cell metabolism, and/or for temporarily arresting certain functions, for example muscular activity, breakdown or excretion of essential cell components and the like, and/or excretory products for example in the form of bile or urine and the like.

Ischaemia is the situation that results from the stopping of blood flow through an organ. The effects are due to lack of oxygen and nutrients; and accumulation of carbon dioxide and other waste products. It is more damaging at body temperature than in the cold, which is why transplant organs are flushed and cooled. Organ donors have frequently suffered trauma and the donor organ may therefore have been subjected to a period of warm ischaemia as a result of the trauma. Adding a period of warm ischaemia experimentally, prior to flush imitates this situation. It is an advantage that our solution provides protection from such warm ischaemia.

Preferably, flush perfusion is carried out at a pressure of up to 300 mmHg, more preferably in the range atmospheric to 200 mmHg, more preferably in the range up to 160 mmHg, more preferably up to 100 mmHg, most preferably up to 50 mmHg.

The method according to this aspect of the invention comprises the use of the preservation solution as herein defined.

In a further aspect of the invention there is provided a kit of parts comprising a preservation solution having, in one part, components (i)-(vi) as herein defined, optionally together with, in one or more further parts, individual components selected from one or more of the additional components as herein defined, for use in the preparation of one or more solutions for specific purpose; and serving as a universal preservation solution.

In embodiments a kit of parts herein comprises a preservation solution having, in one part, components (i)-(vi) as herein defined, of which one or more unstable components are absent and are provided separately, in one or more further parts, for addition immediately prior to use.

According to one aspect of the invention the kit of parts comprises a flush preservation solution having components (i)-(vi) as herein defined.

According to another aspect of the invention the kit of parts comprises a cold storage preservation solution having components (i)-(vi) as herein defined.

DETAILED DESCRIPTION

Figure 1:
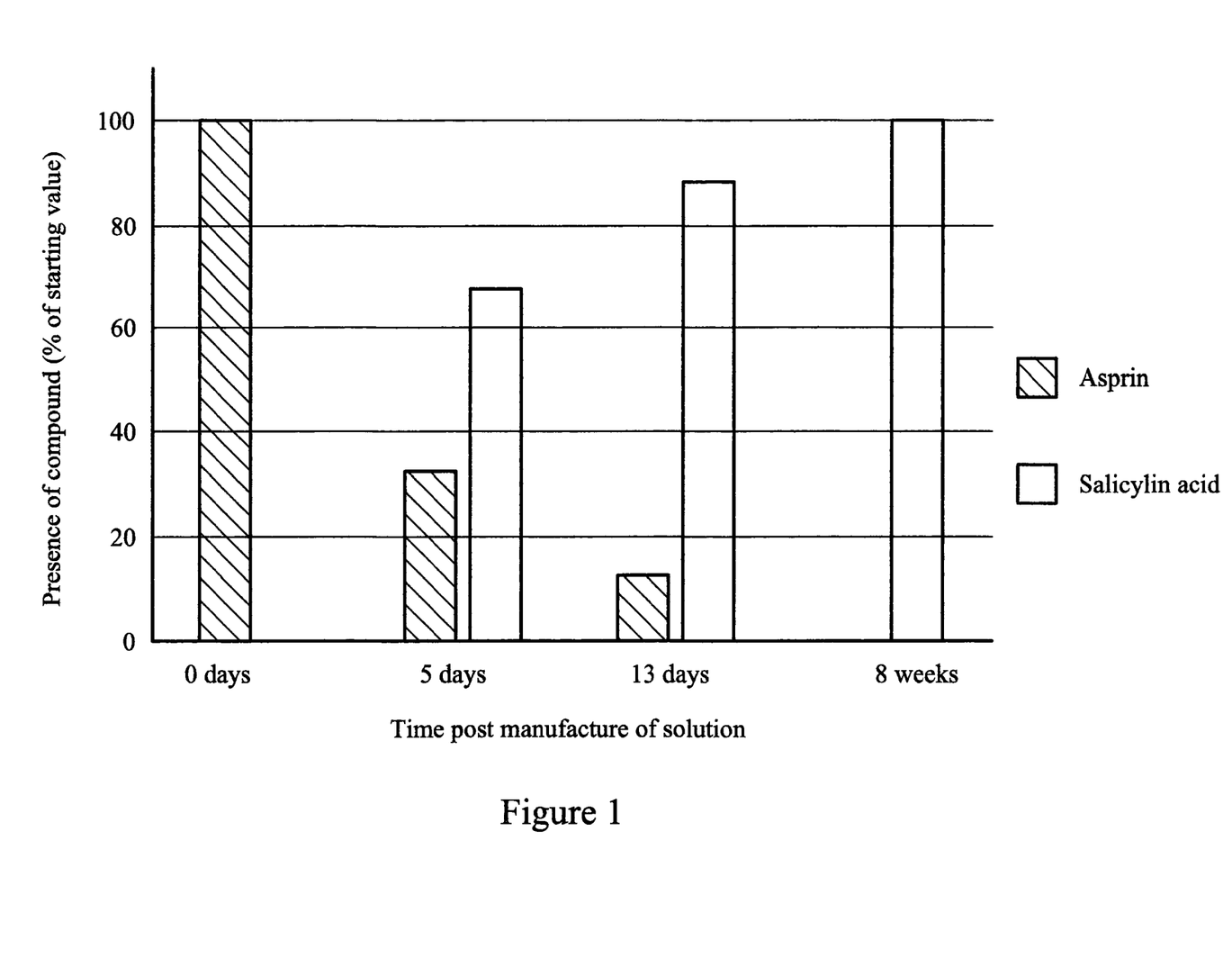
FIG. 1 illustrates the stability of aspirin in a preservation solution.

The invention is now illustrated in non-limiting manner with reference to the examples and with reference to the accompanying figures, in which:

FIG. 1 illustrates the stability of aspirin in a preservation solution: HPLC methods were developed to measure the concentration of aspirin and salicylic acid in the Prior Art solution. Aspirin is rapidly hydrolysed to salicylic acid and acetic acid during storage. After 8 weeks, none of the parent compound remains.

Figure 2:
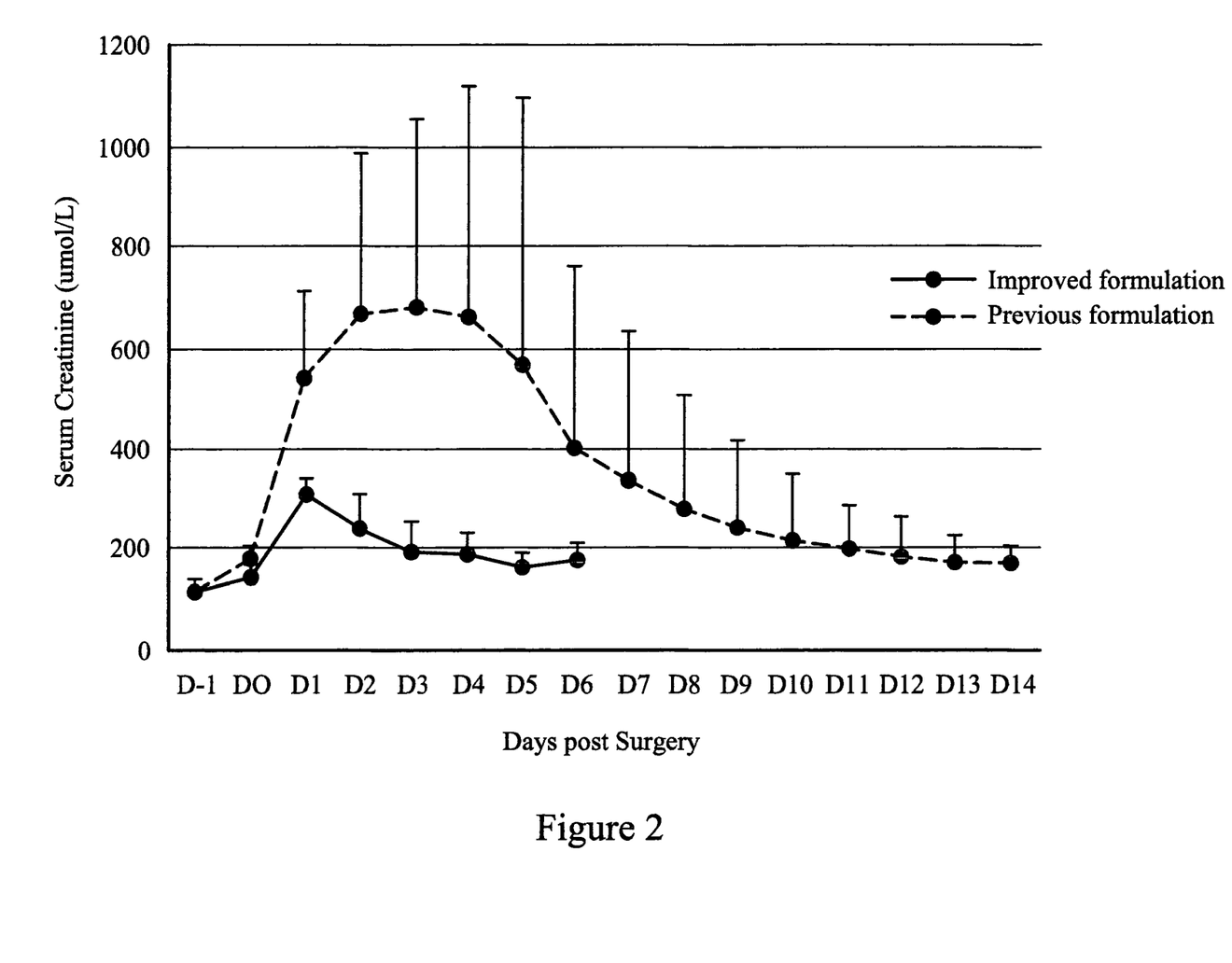
FIG. 2 illustrates serum creatinine following kidney preservation in an Improved Preservation solution (solution of the invention) versus a Previous (prior art) Formulation.

FIG. 2 illustrates serum creatinine following kidney preservation in an Improved Preservation solution (solution of the invention) versus a Previous (prior art) Formulation. Lower serum creatinine illustrates reduced damage to organ.

Figure 3:
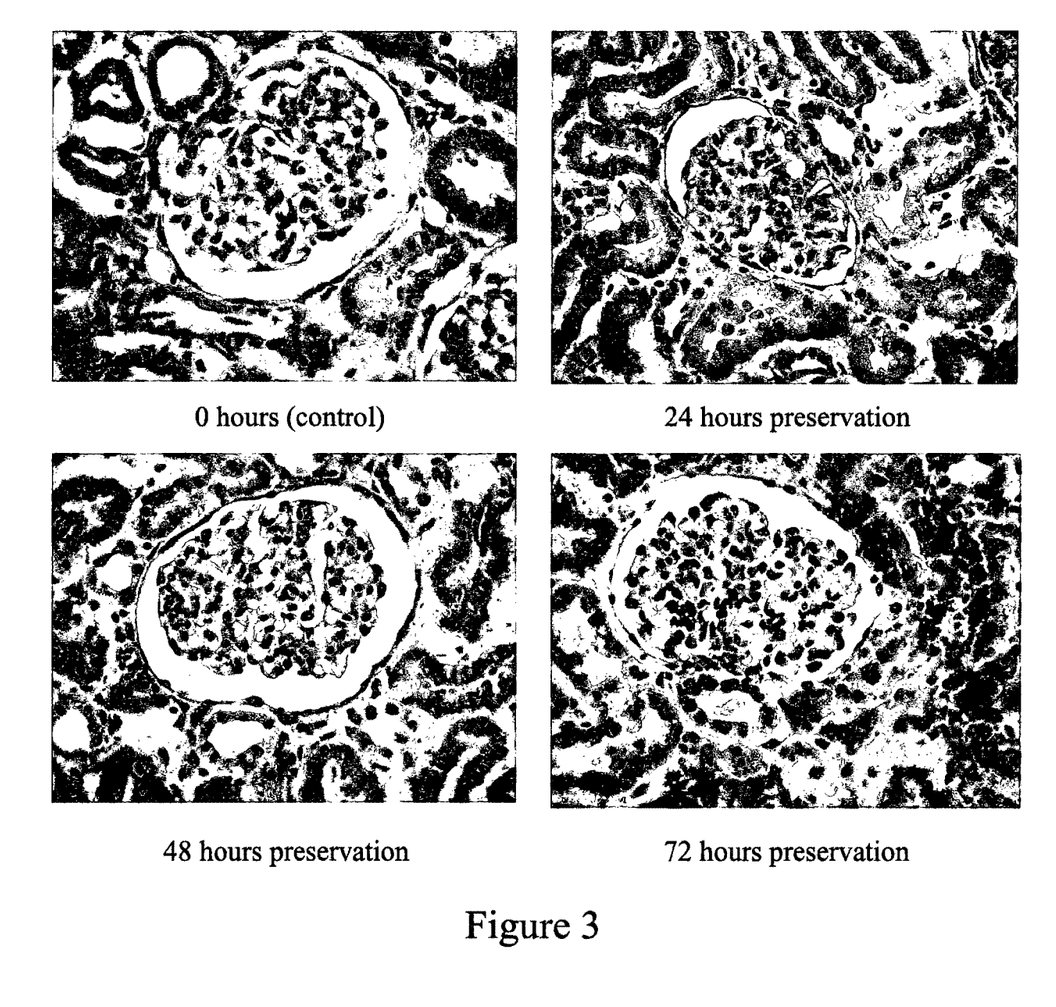
FIG. 3 illustrates the ex vivo preservation of porcine kidney in preservation solution of the invention up to 72 hours outside the body.

FIG. 3 illustrates the ex vivo preservation of porcine kidney in preservation solution of the invention up to 72 hours outside the body. The parenchyma is well preserved with normal glomerulus and tubules. H&E staining, 40× magnification.

EXAMPLE 1

1.1 Flush Preservation Solutions Used in the Invention

The preservation solutions involved in this study are shown in the Tables 1, 2, 3 and 4, amounts are given in mmol/L. Solutions (SOLS) were made up from a flask half filled with water, to which any or all of lactobionate, KOH, sodium phosphate, glutamine or glutamic acid, sucrose, aspirin or salicylic acid, allopurinol and diltiazem were added in sequence and dissolved. The colloid (PEG) was then added and the solution made nearly up to volume. NaOH was added to set the pH. The solution was then made up to volume. All solutions were sterilized by filtration and stored in glass bottles at 4° C. Reduced glutathione was added during preparation or immediately before use. Sources are as indicated above or as disclosed in WO 02/41696.

Comparative

Previous formulation is as disclosed and described in WO 02/41696 and as illustrated in Table 1 herein. UW is a standard original commercial solution (viaSpan/BELZER UW, DU PONT PHARMA).

Composition of Comparative Preservation Solutions

The composition of comparative preservation solutions is illustrated in Table 1:

TABLE 1

| Mmol/L | Prior Art Formulation | University of Wisconsin Solution (Belzer) |
|---|---|---|
| Lactobionic acid | 50 | 105 (K-lactobionate) |
| KOH | 16 | 100 |
| NaOH | 35 | |
| KCl | | 5 |
| Adenosine | | 5 |
| Glutathione | 3 | 3 |
| KHPO$_4$ (iii) | | 25 |
| MgSO$_4$ | | 5 |
| Na$_2$HPO$_4$ (iii) | 26.45 | |
| NaH$_2$PO$_4$ (iii) | 16.66 | |
| Glutamine (vi) | 20 | |
| Sucrose (ii) | 100 | |
| Raffinose (ii) | | 30 |
| Aspirin (v) | 0.5 | |
| Allopurinol | 0.4 | 1 |
| Nicardipine (iv) | 0.005 | |
| PEG (20,000 MW) | 1 | |
| Pentastarch | | 5 |

Composition of the Cold Preservation Solutions of the Invention

The composition of the cold preservation solutions of the invention is illustrated in Table 2:

TABLE 2

| Mmol/L | SOL1.1 | SOL1.2 | SOL1.3 |
|---|---|---|---|
| Lactobionic acid | 50 | 50 | 50 |
| KOH | 5 | 5 | 5 |
| NaOH | 45 | 45 | 45 |

TABLE 2-continued

| Mmol/L | SOL1.1 | SOL1.2 | SOL1.3 |
|---|---|---|---|
| Glutathione | 3 | 3 | 3 |
| Na$_2$HPO$_4$ | 26.45 | 26.45 | 26.45 |
| NaH$_2$PO$_4$ | 16.66 | 16.66 | 16.66 |
| Glutamic acid (vi) | 20 | 0 | 20 |
| Glutamine (vi) | 0 | 20 | 0 |
| Sucrose | 100 | 100 | 100 |
| Salicylic acid (v) | 0.5 | 0.5 | 0 |
| Aspirin (vi) | 0 | 0 | 0.5 |
| Allopurinol | 0.4 | 0.4 | 0.4 |
| Diltiazem | 0.022 | 0.022 | 0.022 |
| PEG (20,000 MW) | 1 | 1 | 1 |

Composition of the Cold Preservation Solutions of the Invention with (v) and/or (vi) in Reduced Amount The composition of the cold preservation solutions of the invention with (v) and/or (vi) in reduced amount is illustrated in Table 3:

TABLE 3

| Mmol/L | SOL2.1 | SOL2.2 | SOL2.3 |
|---|---|---|---|
| Lactobionic acid | 50 | 50 | 50 |
| KOH | 5 | 5 | 5 |
| NaOH | 45 | 45 | 45 |
| Glutathione | 3 | 3 | 3 |
| Na$_2$HPO$_4$ | 26.45 | 26.45 | 26.45 |
| NaH$_2$PO$_4$ | 16.66 | 16.66 | 16.66 |
| Glutamic acid (vi) | 12 | 0 | 12 |
| Glutamine (vi) | 0 | 20 | 0 |
| Sucrose | 100 | 100 | 100 |
| Salicylic acid (v) | 0.3 | 0.3 | 0 |
| Aspirin (vi) | 0 | 0 | 0.5 |
| Allopurinol | 0.4 | 0.4 | 0.4 |
| Diltiazem | 0.022 | 0.022 | 0.022 |
| PEG (20,000 MW) | 1 | 1 | 1 |

Composition of the Cold Preservation Solutions of the Invention with (v) and/or (vi) in Reduced Amount The composition of the cold preservation solutions of the invention with (v) and/or (vi) in reduced amount is illustrated in Table 4:

TABLE 4

| Mmol/L | SOL3.1 | SOL3.2 | SOL3.3 |
|---|---|---|---|
| Lactobionic acid | 50 | 50 | 50 |
| KOH | 5 | 5 | 5 |
| NaOH | 45 | 45 | 45 |
| Glutathione | 3 | 3 | 3 |
| Na$_2$HPO$_4$ | 26.45 | 26.45 | 26.45 |
| NaH$_2$PO$_4$ | 16.66 | 16.66 | 16.66 |
| Glutamic acid (vi) | 3 | 0 | 3 |
| Glutamine (vi) | 0 | 20 | 0 |
| Sucrose | 100 | 100 | 100 |
| Salicylic acid (v) | 0.25 | 0.25 | 0 |
| Aspirin (vi) | 0 | 0 | 0.5 |
| Allopurinol | 0.4 | 0.4 | 0.4 |
| Diltiazem | 0.022 | 0.022 | 0.022 |
| PEG (20,000 MW) | 1 | 1 | 1 |

EXAMPLE 2

The comparative solutions and the flush preservation solutions of the invention were studied in the following systems.

2.1.1 Generation and Impact of Toxic Metabolites Produced by Flush Preservation Solutions Described in Prior Art The flush preservation solution described in International patent application No. WO 02/41696 was found to generate, upon storage, metabolic products which have the potential to be toxic to the cells/tissues/organs under storage. As an example, FIG. 1 illustrates that storage of the solution for 8 weeks results in 100% of the aspirin converting to salicylic acid and the production of equimolar amounts of damaging acetic acid. In a solution which originally contains 0.5 mM aspirin, this results in the formation of 0.5 mM acetic acid, 30 mg/L. Acetic acid is a known irritant and is damaging to human tissues.

By way of further example, the presence of ammonia in the prior art solution has been shown by colorimetric assay. The Ammonia Assay Kit (ab83360) provides a rapid, simple, sensitive, and reliable assay suitable for research and high throughput assay of ammonia and ammonium. In the assay, ammonia and ammonium are converted to a product that reacts with the OxiRed probe to generate color ($\lambda$max=570 nm) which can be easily quantified by plate reader. The kit can detect 1 nmol (~20 µM) of total ammonia and ammonium, which is much more sensitive than measuring ammonia with a NADPH based assay. Using this protocol, it is demonstrated that the Prior Art Solution contains approximately 2.6 mM ammonia. This is many times greater than known toxicity of ammonia, 300 µM is known to be toxic to human cells[1]. In contrast, in the solution of the invention, ammonia is substantially absent, below the lower level of quantification of the assay, less than 2 nmol.
[1] Heeneman et al, Journal of Immunological Methods (1993) 166, 1, p 85-91

Ammonia toxicity can occur by it causing a disturbance in the uptake of potassium by cells. This can cause deleterious effects in all organs and tissues; change in pH, membrane potential and metabolism[2]. In vivo, ammonia would normally be detoxified by the hepatic urea cycle. However, this is unable to occur during the storage or use of the preservation solution as the metabolic activity of the cells is intentionally repressed during cold preservation. This means that the ammonia in the prior art solution remains for the duration of preservation and there is significant potential for cellular damage upon reperfusion. In a solution of the present invention, ammonia is absent and this damage cannot occur.
[2] Dasarathy, S., Mookerjee, R. P., Rackayova, V. et al. Metab Brain Dis (2017) 32: 529. https://doi.org/10.1007/s11011-016-9938-3

In a solution which originally contains 20 mM glutamine or approximately 2.6 mM ammonia and 0.5 mM aspirin, or up to 0.5 mM acetic acid, this results in the formation of up to 0.5 mM acetamide, 30 mg/L. Acetamide is known to be damaging to human tissues.

2.1.2 Absence of Toxic Metabolites in Flush Preservation Solutions of the Invention In solutions of the invention from which aspirin is absent, SOL 1.1, SOL 1.2, SOL 2.1, SOL 2.2, SOL 3.1 and SOL 3.2, acetic acid is substantially absent even after storage, below the lower level of quantification of the assay.

In further solutions of the invention in which aspirin is added immediately prior to use, acetic acid is substantially absent or is at reduced levels during the period of use.

In a solution of the invention from which glutamine is absent, SOL 1.1, SOL 1.3, SOL 2.1, SOL 2.3, SOL 3.1 and SOL 3.3, ammonia is substantially absent even after storage, below the lower level of quantification of the assay, less than 2 nmol.

In further solutions of the invention in which glutamine is added immediately prior to use, ammonia is substantially absent or is at reduced levels during the period of use.

Further, in all solutions of the invention either aspirin or glutamine or both is absent, SOL 1.1, SOL 1.2, SOL 1.3, SOL 2.1, SOL 2.2, SOL 2.3, SOL 3.1, SOL 3.2 and SOL 3.3, and acetamide is substantially absent even after storage.

2.2 Porcine Transplantation Model

For true assessment of the quality of preservation solutions, it is necessary to employ a whole animal model to assess the clinical outcomes of transplantation using the test solutions. The porcine model is most appropriate for this. In brief, the protocol involves retrieval of the organ (liver, kidney, small bowel or pancreas), flush preservation in Test (Invention) or Control solutions (Comparison) and then implantation (allo- or auto-transplant depending on the organ under consideration). Organ function and overall health of the recipient is monitored post-surgery for a clinically appropriate length of time.

The following table gives an indication of the measurements used to assess the functionality of the transplanted organ in the recipient animal. In addition, the overall health and wellbeing of the animal is monitored (body weights, food consumption etc.). At the end of the study the animal is sacrificed and key organs collected for histological analysis.

| | Outcomes to be Measured |
|---|---|
| Liver | ALT |
| | AST |
| | LDH |
| | Bilirubin |
| | Prothrombin clotting time |
| | Urea & electrolytes (Na and K) |
| Kidney | Urea and electrolytes (Na and K) |
| | Creatinine (used to calculate eGFR) |
| Pancreas | Urea and electrolytes (Na and K) |
| | Daily urine sample - qualitative assay for glucose |
| | Blood glucose |
| | Blood amylase & lipase |
| | Glucose tolerance test |

Creatinine is a key blood marker which directly relates to kidney function. A functioning kidney will maintain a low concentration of creatinine; a high level indicates a kidney that is poorly functioning. Post-transplant, the serum creatinine is expected to rise and only falls back to normal levels if/when kidney function is restored. The magnitude of the rise reflects the magnitude of the preservation injury. The speed at which creatinine levels return to normal reflects how quickly the kidney returns to normal function; this itself is a key measure of how well the organ was preserved. FIG. 2 illustrates a recent study within which the preservation solution of the invention significantly outperforms the prior art solution; peak creatinine is significantly lower and kidney function returns to normal much quicker. This is evidence for much reduced tissue damage in the solution of the invention.

Histology

Histology was performed of tissue samples collected from abdominal organs (liver, kidney, pancreas and small intestine) of animals perfused with either University of Wisconsin (UW) (commercially available as Belzer UW® cold storage solution) or the preservation solution of the invention for up to 72 hours. Standard comparator solutions such as UW are typically able to preserve tissue up to approximately 12-24 hours. Tissue samples stained by haematoxylin & eosin (FIG. 3) illustrate normal morphology and good preservation of samples by the preservation solution of the invention for up to 72 hours. Better retention of cytoplasmic contents is seen and nuclear ghosting was also present in the UW group which was absent in the preservation solution of the invention. Further nuclear ghosting is apparent in UW samples at 48 and 72 hours which are absent with the preservation solution of the invention samples. This is evidence that the preservation solution of the invention imparts much reduced cellular damage over extended preservation times.

The invention claimed is:

1. A preservation solution for the In vitro preservation of cells, tissues and/or organs, in the absence of a blood supply, said solution comprising:
    (i) water for injection;
    (ii) at least one saccharide;
    (iii) at least one component with pH buffer properties;
    (iv) optionally at least one component with calcium transport blocking properties or an anti-calcium action activity;
    (v) salicylic acid, in free form or in salt form, or aspirin; and
    provided that if aspirin in (v) is present, glutamine in (vi) is absent, and if glutamine in (vi) is absent, and if glutamine in (vi) is present, aspirin in (v) is absent, such that acetamide is not formed.

2. A preservation solution according to claim 1 wherein if (v) is aspirin, (vi) is glutamic acid, in free form or in salt form.

3. A preservation solution according to claim 1 wherein if (vi) is glutamine, (v) is salicylic acid, in free form or in salt form.

4. A preservation solution according to claim 1 wherein the solution is a flush preservation solution.

5. A preservation solution according to claim 1 wherein the solution is a cold storage preservation solution.

6. A preservation solution according to claim 1 wherein aspirin is absent.

7. A preservation solution according to claim 6 wherein (v) is salicylic acid, in free form or in salt form; and (vi) is glutamic acid, in free form or salt form, or glutamine; and aspirin is absent, and/or wherein acetic acid and/or acetamide is absent.

8. A preservation solution according to claim 1 wherein glutamine is absent.

9. A preservation solution according to claim 8 wherein (v) is salicylic acid, in free form or in salt form, or aspirin; and (vi) is glutamic acid, in free form or salt form; and glutamine is absent, and/or wherein ammonia and/or acetamide is absent.

10. A preservation solution according to claim 1 wherein aspirin and glutamine are absent.

11. A preservation solution according to claim 10 wherein (v) is salicylic acid, in free form or in salt form; and (vi) is glutamic acid, in free form or in salt form, provided that acetamide is absent and/or acetic acid and ammonia are absent.

12. A preservation solution according to claim 10 wherein acetamide is absent and/or aspirin and glutamine are absent.

13. A preservation solution according to claim 1 wherein the at least one component with calcium transport blocking properties or an anti-calcium action activity is present.

14. A preservation solution according to claim 1 wherein at least one component with calcium transport blocking properties or an anti-calcium action activity is absent.

15. A preservation solution according to claim 1 wherein the amount of salicylic acid, in free form or in salt form, is less than 0.5 mmol/L.

16. A preservation solution according to claim 1 wherein the saccharide is selected from one or more of sucrose, raffinose and mannitol.

17. A preservation solution according to claim 1 wherein the pH buffer is selected from a sodium phosphate buffer and a potassium phosphate buffer.

18. A preservation solution according to claim 1 wherein the calcium transport blocker or anti-calcium activity agent is selected from calcium transporters, calcium channel blockers, nicardipine, diltiazem, verapamil, nisoldipine, chlorpromazine or trifluorperazine.

19. A preservation solution according to claim 1 wherein the preservation solution includes at least one anion that is largely impermeable into cells.

20. A preservation solution according to claim 1 wherein the preservation solution includes at least one component with calcium chelating properties.

* * * * *

UNITED STATES PATENT AND TRADEMARK OFFICE
CERTIFICATE OF CORRECTION

| | |
|---|---|
| PATENT NO. | : 11,172,674 B2 |
| APPLICATION NO. | : 16/630948 |
| DATED | : November 16, 2021 |
| INVENTOR(S) | : Corbitt et al. |

Page 1 of 1

It is certified that error appears in the above-identified patent and that said Letters Patent is hereby corrected as shown below:

In the Claims

Column 21, Line 10, cancel the text beginning with "1. A preservation solution for the In vitro preservation of" to and ending "that acetamide is not formed." in Column 21, Line 24, and insert the following claim:
-- 1. A preservation solution for the preservation of in vitro cells, tissues and/or organs, in the absence of a blood supply, said solution comprising:
    (i) water for injection;
    (ii) at least one saccharide;
    (iii) at least one component with pH buffer properties;
    (iv) optionally at least one component with calcium transport blocking properties or an anti-calcium action activity;
    (v) salicylic acid, in free form or in salt form, or aspirin; and
    (vi) provided that if aspirin in (v) is present, glutamine in (vi) is absent, and if glutamine in (vi) is present, aspirin in (v) is absent, such that acetamide is not formed. --

Signed and Sealed this
Ninth Day of April, 2024

Katherine Kelly Vidal
*Director of the United States Patent and Trademark Office*